(12) United States Patent
Hong et al.

(10) Patent No.: US 8,660,492 B2
(45) Date of Patent: Feb. 25, 2014

(54) MOBILE TERMINAL AND METHOD OF CONTROLLING THE SAME

(75) Inventors: Seolmin Hong, Seoul (KR); Seunghyup Ryoo, Seoul (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 13/355,444

(22) Filed: Jan. 20, 2012

(65) Prior Publication Data
US 2012/0295540 A1 Nov. 22, 2012

(30) Foreign Application Priority Data

May 20, 2011 (KR) .......................... 10-2011-0047802

(51) Int. Cl.
*H04B 7/00* (2006.01)
(52) U.S. Cl.
USPC .......................................... 455/41.2; 455/436
(58) Field of Classification Search
USPC ................................. 455/41.1, 41.2, 436, 439
See application file for complete search history.

(56) References Cited

U.S. PATENT DOCUMENTS

| | | | |
|---|---|---|---|
| 2002/0118423 A1* | 8/2002 | Collings ........................ | 359/181 |
| 2010/0210238 A1* | 8/2010 | Cho et al. ...................... | 455/406 |
| 2011/0110346 A1* | 5/2011 | Kim et al. ...................... | 370/338 |
| 2011/0256874 A1* | 10/2011 | Hayama et al. ................ | 455/437 |
| 2012/0052806 A1* | 3/2012 | Takayama et al. ............. | 455/41.2 |
| 2012/0275434 A1* | 11/2012 | Ode et al. ...................... | 370/331 |
| 2012/0295540 A1* | 11/2012 | Hong et al. .................... | 455/41.1 |
| 2013/0116006 A1* | 5/2013 | Byrne et al. ................... | 455/552.1 |

* cited by examiner

*Primary Examiner* — Creighton Smith
(74) *Attorney, Agent, or Firm* — Lee, Hong, Degerman, Kang & Waimey

(57) ABSTRACT

A mobile terminal and a method of controlling the same are provided. The mobile terminal includes: a wireless Internet module; a short range communication module; and a controller for exchanging data through a first communication link using the wireless Internet module, wherein the first communication link is formed based on link data including maintenance information that acquires through a second communication link that forms with at least one other terminal positioned within a predetermined distance using the short range communication module. Therefore, a communication link using a wireless Internet module based on information acquired through a communication link formed using a short range communication module can be formed.

19 Claims, 18 Drawing Sheets

FIG. 9
(a) 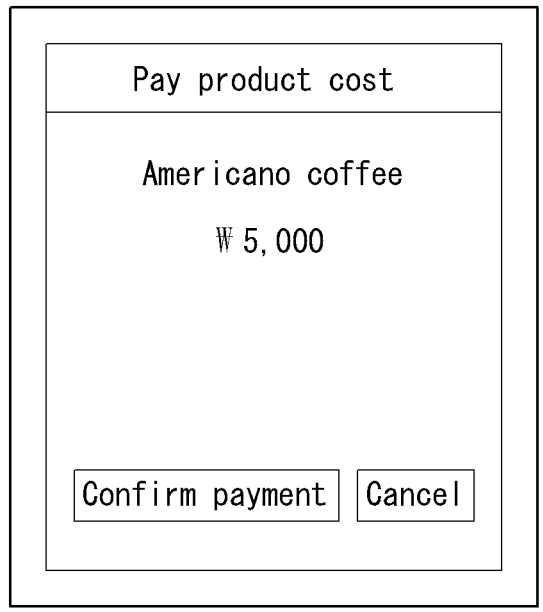
(b) 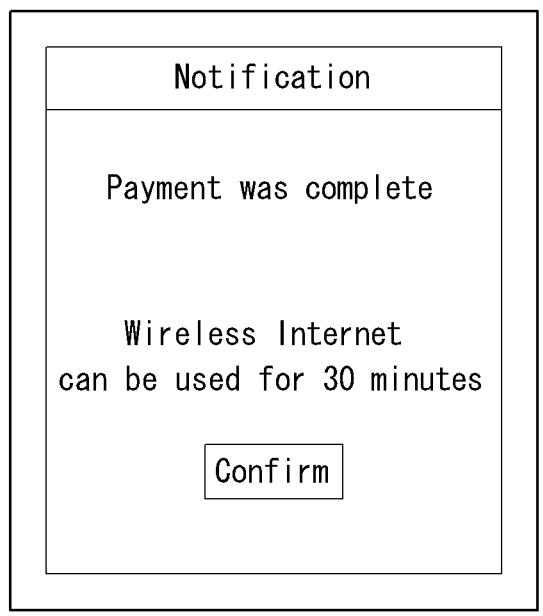

| Select product to purchase | |
|---|---|
| Americano | ₩ 5,000 |
| | Purchase |
| Wireless Internet 30 minutes | |
| Cappuccino | ₩ 10,000 |
| | Purchase |
| Wireless Internet 1 hour | |
| Green-tea latte | ₩ 15,000 |
| | Purchase |
| Wireless Internet 2 hours | |

151

(b)

Notification

Payment for cappuccino was complete

Wireless Internet can be used for 1 hour

Confirm

Pay product cost

Americano coffee
Two cups
₩10,000

Confirm payment | Cancel (b)

151

Notification

Coupon was issued

Caffe bene
Coupon bene
Coupon

Store | Use

FIG. 12
(a) 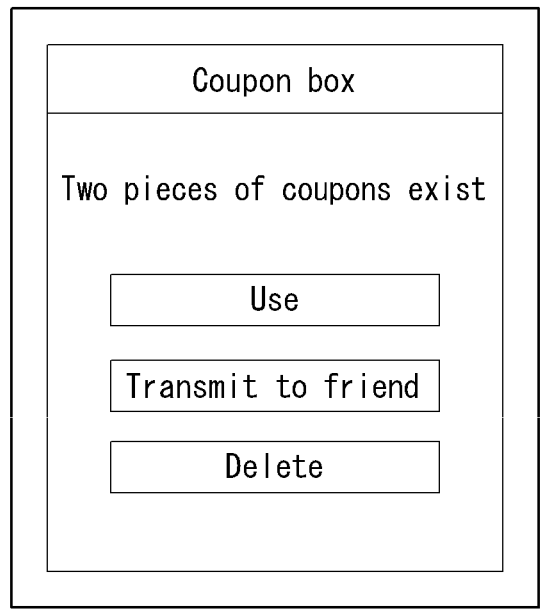
(b) 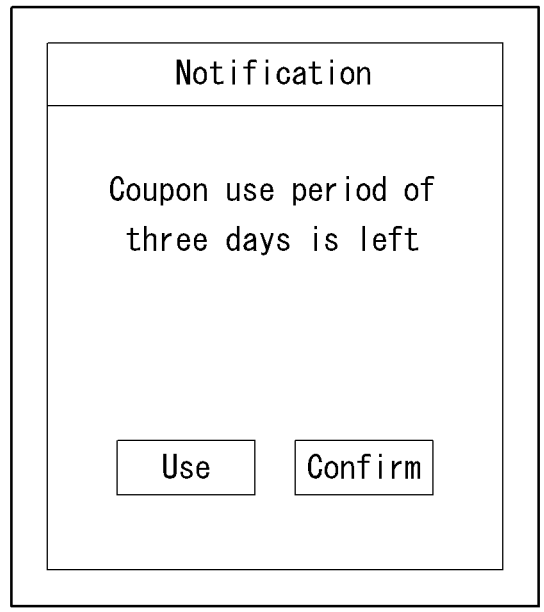

FIG. 17

| Offset | Content | Length | Explanation |
|---|---|---|---|
| 0 | 0x91 | 1 | NDEF record header (TNF=0x01, SR=1, MB=1, ME=0, IL=0) |
| 1 | 0x02 | 1 | Record type length (2 byte) |
| 2 | 0x0A | 1 | Payload length (10 byte) |
| 3 | 0x48, 0x72 | 2 | Record type: "Hr" |
| 5 | 0x10 | 1 | Version number (major, minor) |
| 6 | 0xD1 | 1 | NDEF record header (TNF=0x01, SR=1, MB=1, ME=1, IL=0) |
| 7 | 0x02 | 1 | Record type length (2 byte) |
| 8 | 0x04 | 1 | Payload length (4 byte) |
| 9 | 0x61, 0x63 | 2 | Record type: "ac" |
| 11 | 0x01 | 1 | Carrier Flags (CPS=1 "active") |
| 12 | 0x01 | 1 | Carrier Data Reference Length (1 byte) |
| 13 | 0x30 | 1 | Carrier Data Reference |
| 14 | 0x00 | 1 | Auxiliary Data Reference Count (0) |
| 15 | 0x5A | 1 | NDEF record header (TNF=0x01, SR=1, MB=0, ME=1, IL=1) |
| 16 | 0x02 | 1 | Record type length (2 byte) |
| 17 | 0x19 | 1 | Payload length (25 byte) |
| 18 | 0x01 | 1 | Payload ID length (1 byte) |
| 19 | 0x48, 0x63 | 2 | Record type: "Hc" |
| 21 | 0x30 | 1 | Payload ID "0" |
| 22 | 0x02 | 1 | Carrier Type Format CTF=0x02 |
| 23 | 0x17 | 1 | Carrier Type Length (23 byte) |
| 24 | "application/vnd.wfa.wsc" | 23 | Carrier Type |

FIG. 19

| Name | Size | Mandatory /Conditional /Optional | Description |
|---|---|---|---|
| Version | 1 byte | M | Version Number |
| Credential | | M | Attribute including the following indented parameters |
| Network Index | 1 byte | M | |
| SSID | 0-32 byte | M | Networ Name |
| Authentication Type | 2 byte | M | Authentication Capabilities |
| Encryption Type | 2 byte | M | Encryption Capabilities |
| Network Key Index | 1 byte | O | |
| Network Key | 8-64 byte | M | Encryption Key |
| MAC Address | 6 byte | M | MAC Address of the sending device |
| EAP Type | 0-8 byte | O | |
| EAP Identity | 0-64 byte | O | |
| Key Provided Automatically | 1 byte | O | |
| 802.1x Enabled | 1 byte | O | |
| Network Key Shareable | 1 byte | O | Optional, this attribute is inside Vendor Extension, and it may be pressent only in[WSC2]or [WSCl] |
| Time credit | 1 byte | O | 0~255, number of remains decrements according to specified time interval |
| <other...> | n byte | O | Any attribute defined in[WPS], [WSC2]or[WSCl] |
| Version2 | 1 byte | O | Conditional, this attribute is inside Vendor Extension, and it shall be present only in[WSC2] or[WSCl] |
| <other...> | n byte | O | Any attribute defined in[WPS], [WSC2]or[WSCl] |

FIG. 20

| Name | Size | Mandatory /Conditional /Optional | Description |
|---|---|---|---|
| Version | 1 byte | M | Version Number |
| Credential | | M | Attribute including the following indented parameters |
| Network Index | 1 byte | M | |
| SSID | 0-32 byte | M | Networ Name |
| Authentication Type | 2 byte | M | Authentication Capabilities |
| Encryption Type | 2 byte | M | Encryption Capabilities |
| Network Key Index | 1 byte | O | |
| Network Key | 8-64 byte | M | Encryption Key |
| MAC Address | 6 byte | M | MAC Address of the sending device |
| EAP Type | 0-8 byte | O | |
| EAP Identity | 0-64 byte | O | |
| Key Provided Automatically | 1 byte | O | |
| 802.1x Enabled | 1 byte | O | |
| Network Key Shareable | 1 byte | O | Optional, this attribute is inside Vendor Extension, and it may be pressent only in[WSC2]or [WSCI] |
| Time credit | 1 byte | O | 0 ~ 255, number of remains decrements according to specified time interval |
| Purchase item | 1 byte | O | Category can be defined according to demands |
| <other...> | n byte | O | Any attribute defined in[WPS], [WSC2]or[WSCI] |
| Version2 | 1 byte | O | Conditional, this attribute is inside Vendor Extension, and it shall be present only in[WSC2] or[WSCI] |
| <other...> | n byte | O | Any attribute defined in[WPS], [WSC2]or[WSCI] |

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2011-0047802, filed on May 20, 2011, the contents of which are hereby incorporated by reference herein in its entirety.

FIELD OF THE INVENTION

The present invention relates to a mobile terminal and a method of controlling the same, and more particularly, to a mobile terminal and a method of controlling the same that can form a communication link using a wireless Internet module based on information acquired through a communication link formed using a short range communication module.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

SUMMARY

An aspect of the present invention is to provide a mobile terminal and a method of controlling the same that can form a communication link using a wireless Internet module based on information acquired through a communication link formed using a short range communication module.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 8 to 12 are diagrams illustrating operation of a mobile terminal according to an embodiment of the present invention;

FIG. 17 is a diagram illustrating a binary content of a Wi-Fi handover request message according to an embodiment of the present invention;

FIG. 19 is a diagram illustrating a binary content of a handover selection message according to an embodiment of the present invention; and FIG. 20 is a diagram illustrating a binary content of a handover selection message according to another embodiment of the present invention.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
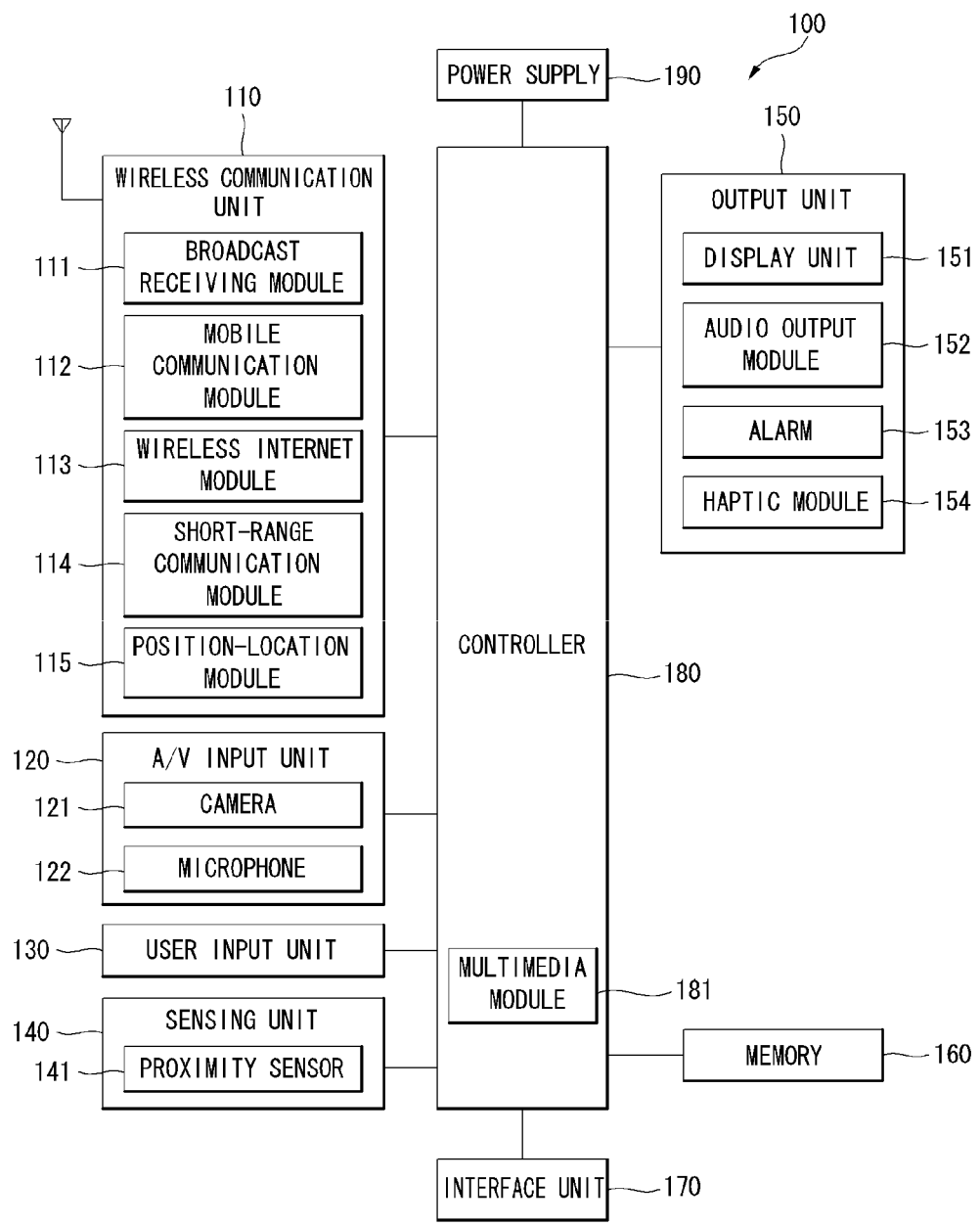
FIG. 1 is a block diagram of a mobile terminal according to an embodiment of the present invention.

FIG. 1 is a block diagram of a mobile terminal 100 according to an embodiment of the present invention. Other embodiments, configurations and arrangements may also be provided. As shown, the mobile terminal 100 may include a wireless communication unit 110, an audio/video (NV) input unit 120, a user input unit 130, a sensing unit 140, an output unit 150, a memory 160, an interface 170, a controller 180, and a power supply 190. Not all of the components shown in FIG. 1 may be essential parts and the number of components included in the mobile terminal 100 may be varied. The components of the mobile terminal 100 will now be described.

The wireless communication unit 110 may include at least one module that enables wireless communication between the mobile terminal 100 and a wireless communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114, and a location (or position) information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, wireless broadcasting signals, and data broadcasting signals but also signals in the form of a combination of a TV broadcasting signal and a wireless broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a wireless signal to/from at least one of a base station, an external terminal and a server on a mobile communication network. The wireless signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

Figure 2:
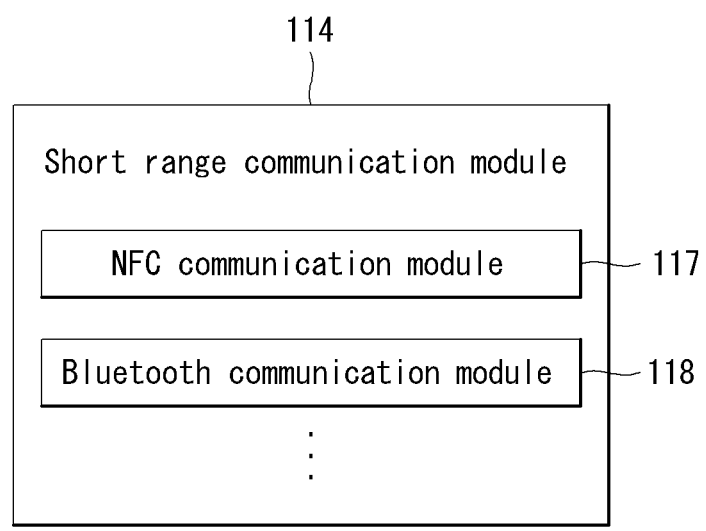
FIG. 2 is a detailed block diagram illustrating a short range communication module of a mobile terminal according to an embodiment of the present invention.

FIG. 2 is a detailed block diagram illustrating a short range communication module 114 of a mobile terminal 100 according to an embodiment of the present invention. Referring to FIG. 2, the short range communication module 114 may include an NFC communication module 117, a Bluetooth communication module 118 and so on.

The NFC communication module 117 performs data communication with devices positioned at a distance within 10 cm (preferably within 4 cm) using very short-range contactless data transfer technology related to radio frequency identification (RFID). An electronic device that adapts NFC technology can communicate with another electronic device that adapts NFC technology through at least one of for example, a reader mode, a card emulation mode, and a peer to peer mode. Hereinafter, the NFC communication module 117 will be described in detail with reference to FIG. 3.

The Bluetooth communication module 118 performs data communication with devices within a radius 10 to 100 m using Bluetooth, which is one of short range wireless communication formats. For reference, Bluetooth is short range wireless networking technology together developed by a Bluetooth special interest group (SIG) established by five companies such as Eriksson and Toshiba on 1998.

The block diagram shown in FIG. 2 is an example of the short range communication module 114 of the mobile terminal 100 according to the present embodiment, and elements of the short range communication module 114 are not essential elements, and the short range communication module 114 may include elements more than or fewer than those shown in FIG. 2.

The location information module 115 may confirm or obtain the position of the mobile terminal 100. The position information module 115 may obtain position information by using a global navigation satellite system (GNSS). The GNSS is a terminology describing a wireless navigation satellite system that revolves around the earth and transmits reference signals to predetermined types of wireless navigation receivers such that the wireless navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151 which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141.

The output unit 150 may generate visual, auditory and/or tactile output and may include the display 151, an audio output module 152, an alarm 153 and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display.

The transparent display may include a transparent liquid crystal display. The rear structure of the display 151 may also be of a light transmissive type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, or inputting touch. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 3:
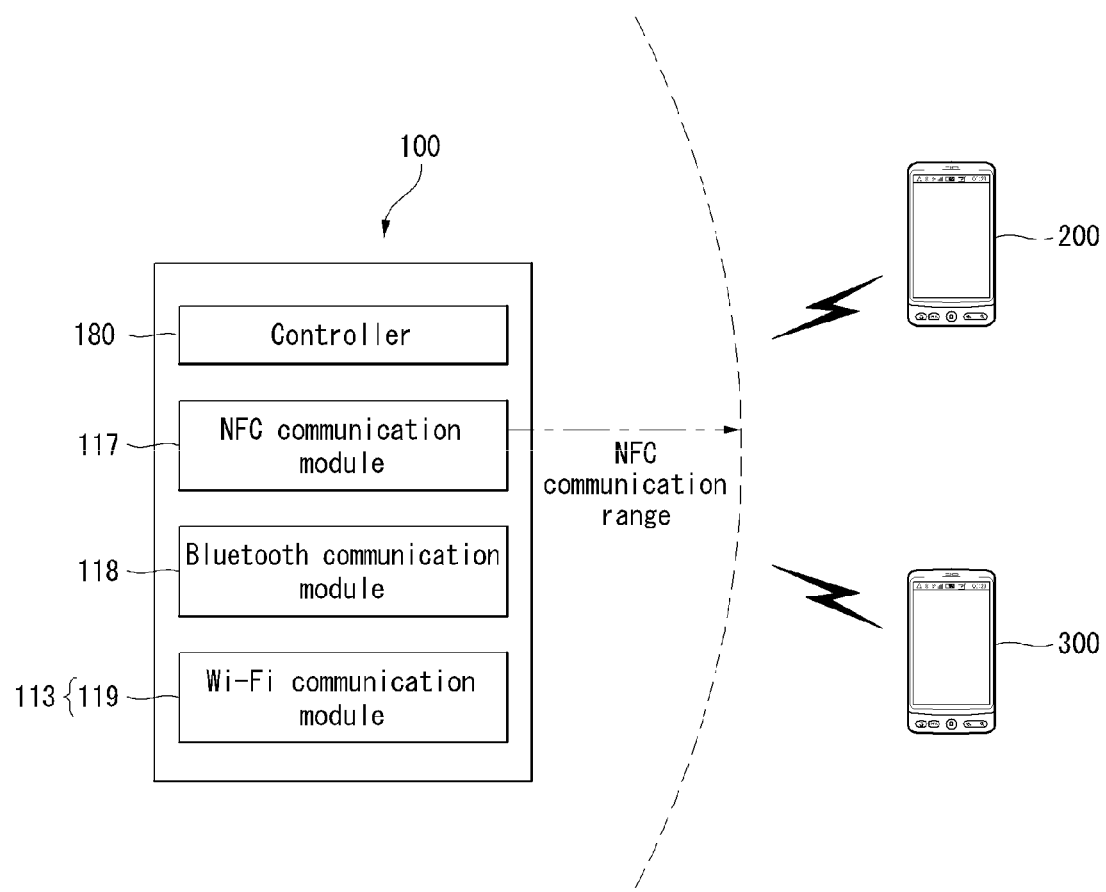
FIG. 3 is a diagram illustrating a system environment including a mobile terminal according to an embodiment of the present invention.

FIG. 3 is a diagram illustrating a system environment including the mobile terminal 100 according to an embodiment of the present invention. As shown in FIG. 3, the system environment may be formed with the mobile terminal 100 according to the present embodiment and one or more other electronic devices 200 and 300 that can form an NFC link with the mobile terminal 100.

Because these are not essential elements of the system environment, the system environment may include elements fewer than or more than those shown in FIG. 3. Further, in FIG. 3, in order to mainly describe a communication link forming characteristic of the mobile terminal 100, only constituent elements necessary for forming a communication link are briefly shown.

In FIG. 3, the system environment is formed with mobile terminals 100, 200, and 300, but the electronic devices 100, 200, and 300 described in this document may be a random electronic device for supporting NFC communication. That is, the electronic devices 100, 200, and 300 may be a mobile terminal such as a mobile phone, a smart phone, and a tablet PC for supporting NFC communication and may be an electronic device such as a printer, a television, a digital television, a computer, and an audio device. Hereinafter, an electronic device having an NFC communication function may be referred to as an NFC electronic device.

Further, in FIG. 3, the mobile terminal 100 forms an NFC link with the other electronic devices 200 and 300 based on NFC communication technology, which is a kind of short range communication technology, but a range of the present invention is not limited thereto. For example, the mobile terminal 100 may form a wireless communication link with the other electronic devices 200 and 300 using short range wireless communication technology other than NFC communication technology.

Referring again to FIG. 3, the mobile terminal 100 includes the controller 180, the NFC communication module 117, the Bluetooth communication module 118, and a Wi-Fi communication module 119.

The controller 180 controls constituent elements within the mobile terminal 100. The NFC communication module 117 enables the mobile terminal 100 to form an NFC link with the other electronic devices 200 and 300 that support NFC communication. The NFC communication module 117 may indicate an NFC forum device. In this document, the NFC communication module 117 may be referred to as a short range communication means.

As shown in FIG. 3, the NFC communication module 117 forms an NFC link through tagging with an NFC communication module of the other electronic devices 200 and 300 within an NFC communication range.

The NFC communication module 117 communicates in various modes with the NFC communication module of the other electronic devices 200 and 300. For example, the various modes may include a card emulation mode, a reader mode, and a peer to peer mode.

When the NFC communication module 117 operates in the card emulation mode, the NFC communication module 117 of the mobile terminal 100 functions as a card, i.e., a tag. In this case, NFC communication modules of the other electronic devices 200 and 300 operate in a reader mode and acquire data from the NFC communication module 117 of the mobile terminal 100.

When the NFC communication module 117 operates in the reader mode, the NFC communication module 117 of the mobile terminal 100 functions as a reader. In this case, the NFC communication module 117 of the mobile terminal 100 acquires data from the NFC communication modules of the other electronic devices 200 and 300 operating in an emulation mode.

When the NFC communication module 117 operates in the peer to peer mode, the NFC communication module 117 of the mobile terminal 100 and the NFC communication modules of the other electronic devices 200 and 300 can exchange data.

A mode of the NFC communication module 117 is determined according to a predetermined reference. For example, a mode of the NFC communication module 117 may be set according to a user input, or predetermined algorithm.

The mobile terminal 100 may form an NFC link through the NFC communication module 117 with the other electronic devices 200 and 300 and then form a communication link of kinds different from the NFC link with the other electronic devices 200 and 300 through the Bluetooth communication module 118 and/or the Wi-Fi communication module 119. Therefore, even if the NFC communication link is disconnected, the mobile terminal 100 can continue to perform data communication with the other electronic devices 200 and 300 through the Bluetooth communication module and/or the Wi-Fi communication module.

In this document, after the NFC link is formed, a series of processes of forming another communication link in order to enable the mobile terminal 100 to continue to communicate with the other electronic devices 200 and 300 using other wireless communication technology are referred to as handover.

Referring to FIG. 3, in the mobile terminal 100 according to the present embodiment, handover from an NFC communication link to a Bluetooth communication link or a Wi-Fi communication link can be performed, but a range of the present invention is not limited thereto. For example, the mobile terminal 100 may perform handover to various communication links such as an RFID communication link and a wireless gigabit (WiGig) communication link.

Although not shown in FIG. 3, the other electronic devices 200 and 300 include elements corresponding to the mobile terminal 100. That is, the other electronic devices 200 and 300 include a controller, an NFC communication module, a Bluetooth communication module, and a Wi-Fi communication module.

In other words, the handover indicates that the mobile terminal 100 performs data communication by forming an NFC link and then forming another communication link with the other electronic devices 200 and 300, and a user can easily form an NFC link through NFC tagging between the mobile terminal 100 and the other electronic devices 200 and 300 and change a communication means to an alternate communication link appropriate for transmitting a longer distance and/or a more amount of data than the NFC link.

Hereinafter, a handover process of the mobile terminal 100 according to the present embodiment will be described in detail with reference to the drawings. For convenience of description, a handover process is described with reference to the system environment shown in FIG. 3. The spirit of the present invention is not limited to a specific environment or a specific device.

Figure 4:
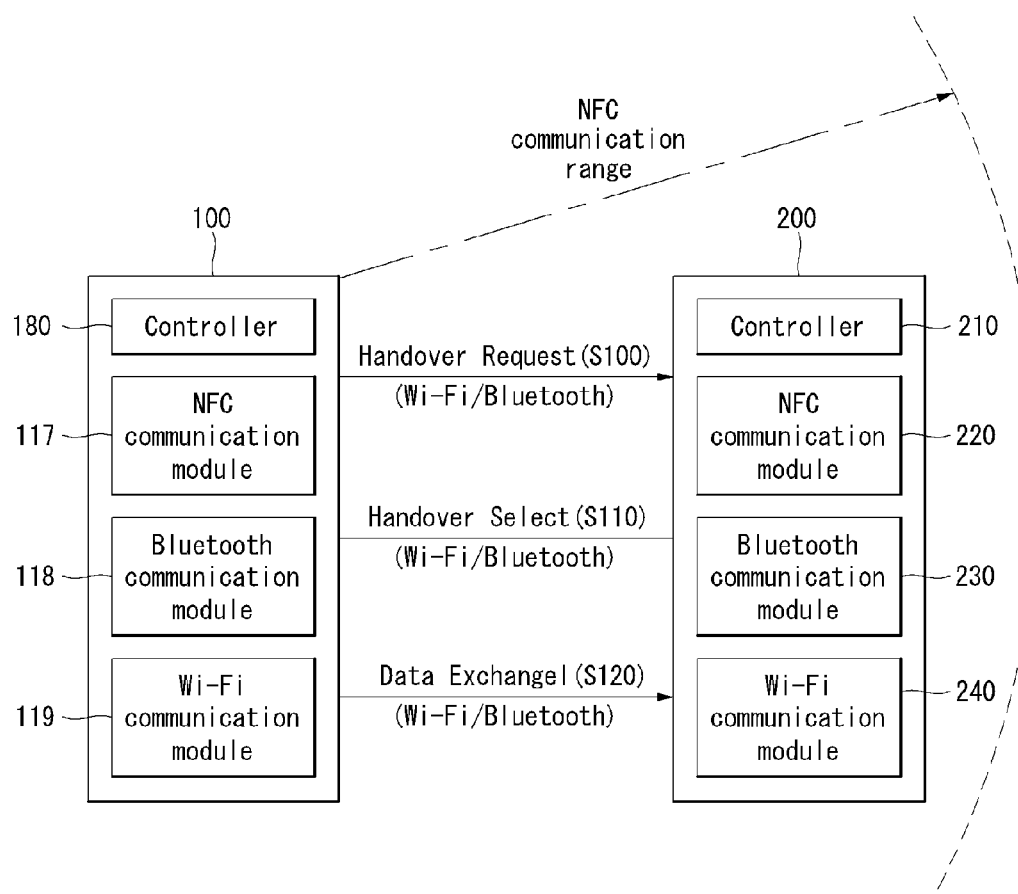
FIG. 4 illustrates an example in which a mobile terminal according to an embodiment of the present invention forms a communication link with another electronic device.

FIG. 4 illustrates an example in which the mobile terminal 100 according to an embodiment of the present invention forms a communication link with the another electronic device 200. Hereinafter, a process of forming a communication link will be described with reference to the drawings.

Referring to FIG. 4, the mobile terminal 100 transmits a handover request message to the another electronic device 200 (S110). Before step S110, the mobile terminal 100 and the another electronic device 200 may form a communication link through a first communication means. For example, as shown in FIG. 4, the mobile terminal 100 may form an NFC link through tagging to an NFC communication module 220 included in the another electronic device 200.

When the NFC link is formed, the mobile terminal 100 transmits a message, for example a handover request message, for a handover request to the another electronic device 200 through the NFC link.

As the mobile terminal 100 transmits the handover request message to the another electronic device 200, the mobile terminal 100 and the another electronic device 200 start a protocol for forming another communication link through the NFC link formed between the mobile terminal 100 and the another electronic device 200.

Here, the mobile terminal 100 is a handover requester, and the another electronic device 200 is a handover selector. The handover requester is a device for starting a handover protocol by transmitting a handover request message to another NFC electronic device, and the handover selector is an NFC device for forming and responding a handover selection message as a response to a received handover request message.

That is, the handover requester (i.e. a handover request device) and the handover selector (i.e. a handover selection device) are relative concepts to be determined according to transmission of a handover request message or transmission of a handover selection message. Therefore, when the another electronic device 200 transmits a handover request message to the mobile terminal 100 according to a situation, the mobile terminal 100 may become a handover selector and the another electronic device 200 may become a handover requester.

The handover request message includes information about another communication module in which the mobile terminal 100 supports. For example, as shown in FIG. 4, when the mobile terminal 100 supports Bluetooth and Wi-Fi, the handover request message may include information about Bluetooth and Wi-Fi in which the mobile terminal 100 supports.

A priority order is set to communication technology used for handover and in which the mobile terminal 100 supports. For example, as shown in FIG. 4, the handover request message has information about a communication module for supporting communication technology having a high priority order at the front thereof and has information about a communication module for supporting communication technology having a low priority order at the rear thereof. Referring to the handover request message shown in FIG. 4, it can be seen that information about a Wi-Fi communication module has a priority order higher than information about a Bluetooth communication module.

The another electronic device 200, having received the handover request message transmits a response to the handover request message to the mobile terminal 100 (S120). For example, the another electronic device 200 may generate a handover selection message as an example of a response to the handover request message through the NFC link and transmit the generated handover selection message to the mobile terminal 100.

The another electronic device 200 determines a communication module included in the mobile terminal 100 by analyzing the handover request message and provides information about the communication module included in the another electronic device 200 to the mobile terminal 100 according to the determination. That is, information about communication module included in the handover selection message includes information about a communication module included in the another electronic device 200 among communication modules included in the mobile terminal 100.

Referring to FIG. 4, a controller 210 of the another electronic device 200 determines that the Bluetooth communication module 118 and the Wi-Fi communication module 119 are included in the mobile terminal 100 by analyzing the received handover request message and transmits a handover selection message including information about a Bluetooth communication module 230 and a Wi-Fi communication module 240 included in the another electronic device 200 to the mobile terminal 100.

When a handover selection message is received from the another electronic device 200, the controller 180 of the mobile terminal 100 determines that the Bluetooth communication module 230 and the Wi-Fi communication module 240 are included in the another electronic device 200 by analyzing the handover selection message and acquires information thereof.

Thereafter, the mobile terminal 100 forms a communication link with communication modules included in the another electronic device 200 based on the acquired information and performs data communication with the another electronic device 200 through the formed communication link (S120).

For example, in order to change an NFC communication link with the another electronic device 200 to a Bluetooth communication link, the controller 180 of the mobile terminal 100 may perform Bluetooth pairing with the another electronic device 200. Thereby, the mobile terminal 100 can continue to perform communication according to a Bluetooth protocol by converting a communication link with the another electronic device 200 from the NFC communication link to the Bluetooth communication link.

As handover of a communication link between the mobile terminal 100 and the another electronic device 200 is performed from the NFC communication link to the Bluetooth communication link, even if the mobile terminal 100 and the another electronic device 200 are no longer positioned within an NFC communication range shown in FIG. 4, data communication can be performed, and data can be exchanged with a transmission speed faster than the NFC link.

In other words, when the mobile terminal 100 is a smart phone, the user brings the smart phone to a periphery of the another electronic device 200 and performs tagging with the another electronic device 200, and thus an NFC link is formed, and by performing a handover protocol, a communication means can be changed to the Bluetooth communication link. Therefore, even if the user takes a smart phone out of an NFC communication range, the smart phone and the another electronic device 200 can continue to perform data communication through the Bluetooth communication link.

Further, in order to change the NFC communication link with the another electronic device 200 to the Wi-Fi communication link, the controller 180 of the mobile terminal 100 may perform a process of forming a Wi-Fi communication link with the another electronic device 200 and perform data communication with the another electronic device 200 through the formed Wi-Fi communication link. Therefore, the mobile terminal 100 can perform data communication with the another electronic device 200 even outside an NFC communication range with a data transmission and reception speed faster than the NFC communication link.

In this case, when a plurality of communication links that can be changed from the NFC communication link exist, the controller 180 of the mobile terminal 100 may perform handover for only a communication link selected from the plurality of communication links and perform handover to the plurality of communication links. Further, when a communication link for performing handover is selected from a plurality of communication links, the controller 180 may select a communication link according to a predetermined priority order.

In the foregoing description, a process in which the mobile terminal 100 according to an embodiment of the present invention performs handover of a communication link (e.g., NFC communication link) with a communication module included in the another electronic device 200 to at least one of communication links (e.g., Bluetooth communication link, Wi-Fi communication link) with other communication modules included in the another electronic device 200 has been described with reference to FIGS. 3 and 4.

Hereinafter, a process in which the mobile terminal 100 according to an embodiment of the present invention forms a communication link with a data storage element that stores information about communication modules included in the another electronic device and then performs handover of the formed communication link to a communication link with other communication module included in another electronic device will be described.

Figure 5:
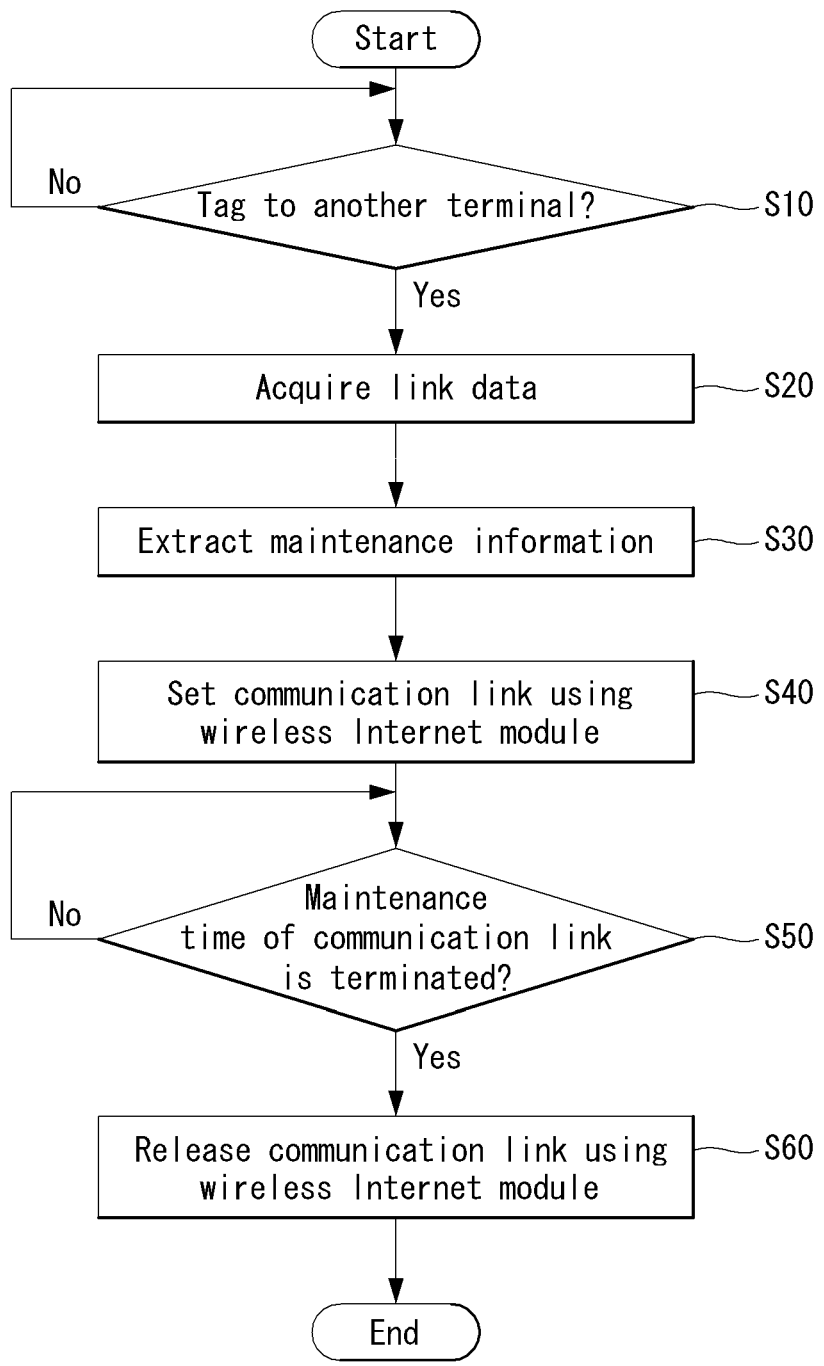
FIG. 5 is a flowchart illustrating an operation process of a mobile terminal according to an embodiment of the present invention.
Figure 6:
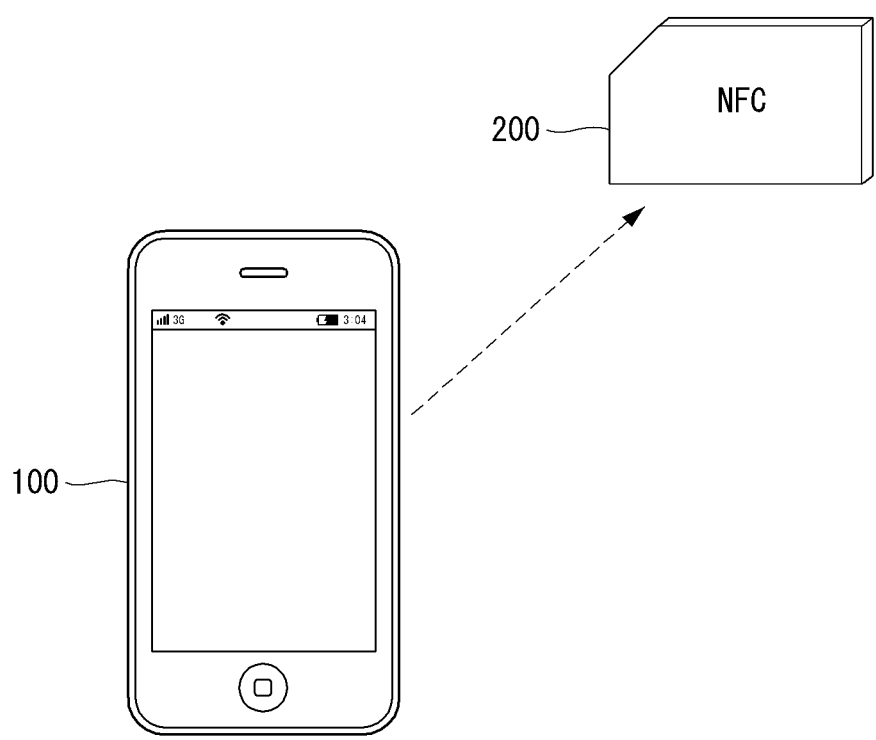
FIG. 6 is a diagram illustrating tagging of the mobile terminal of FIG. 5.

FIG. 5 is a flowchart illustrating an operation process of a mobile terminal according to an embodiment of the present invention, and FIG. 6 is a diagram illustrating tagging of the mobile terminal of FIG. 5.

As shown in FIGS. 5 and 6, the controller (180 of FIG. 1) of the mobile terminal 100 according to an embodiment of the present invention determines whether the mobile terminal 100 is tagged to the another terminal 200 (S10).

Tagging indicates operation of approaching the mobile terminal 100 within a predetermined distance from the another terminal 200. A user can perform tagging by approaching the mobile terminal 100 to the another terminal 200 while holing the mobile terminal 100. The another terminal 200 may be an electronic device or a tag that can perform NFC communication.

When tagging is performed, a communication link using the short range communication module (114 of FIG. 1) is formed between the another terminal 200 and the mobile terminal 100. For example, an NFC communication link may be formed. When the NFC communication link is formed, data can be exchanged through the link.

When tagging to another terminal is performed, the controller 180 acquires link data (S20), extracts maintenance information from the acquired link data (S30), and sets a communication link using a wireless Internet module (S40).

The link data may be acquired from the another terminal 200 using the short range communication module 114. The link data may be acquired through an NFC module, which is the short range communication module 114.

The link data may include data for enabling communication to perform using other communication modules other than the short range communication module 114. For example, the link data may include data that can perform handover. As described above, communication using the short range communication module 114 is performed when the mobile terminal 100 and the another terminal 200 are adjacently disposed. The mobile terminal 100 according to an embodiment of the present invention exchanges data necessary for handover when the mobile terminal 100 and the another terminal 200 are adjacently disposed and performs handover with another communication means based on the exchanged data. For example, the mobile terminal 100 may acquire link data through NFC communication and perform Wi-Fi communication based on the acquired link data.

Maintenance information may be data used for determining a connection state of another communication means in which handover is performed. The maintenance information may be data for determining a maintenance time and a communication speed of another communication means in which handover is performed. This can be more clearly understood in consideration of the following situation. For example, when a user buys coffee at a coffee shop, the user's mobile terminal 100 may be tagged to the another terminal 200, which is an NFC device within the shop. When tagged to the NFC device, link data including maintenance information are exchanged using an NFC communication link formed between the user's mobile terminal 100 and the another terminal 200. The mobile terminal 100 extracts maintenance information from link data. The extracted maintenance information is used as information that determines a communication maintenance time with a Wi-Fi communication means provided within the shop. For example, the extracted maintenance information may be used for connecting a Wi-Fi link for 30 minutes and then disconnecting the Wi-Fi link, or for maintaining a data transmission speed of the Wi-Fi link to a predetermined speed or less.

Various other communication means for handover in short range communication may exist. For example, various other communication means may be Wi-Fi communication, Bluetooth communication, and infrared ray communication means in NFC. However, for convenience of description, by describing a case in which another communication means in which handover is performed is Wi-Fi, a description about other communication means will be omitted.

Maintenance information may be variously changed. For example, a time and speed for maintaining a link of a communication means in which handover is performed may be differently set according to a kind, an amount, and a price of a product bought by a user of the mobile terminal 100. Therefore, customers' interest for products that sell at a shop can be increased.

When a communication link using a wireless Internet module is set, the controller 180 determines whether a maintenance time of the communication link is terminated (S50), and if a maintenance time of the communication link is terminated, the controller 180 releases a communication link using a wireless Internet module (S60).

As described above, the communication link maintenance time is set based on maintenance information acquired through the short range communication module 114.

If the communication link maintenance time is terminated, a communication link using the wireless Internet module (113 of FIG. 1) is released. For example, when a preset time period of 30 minutes has been elapsed, the wireless Internet link may be terminated.

Figure 7:
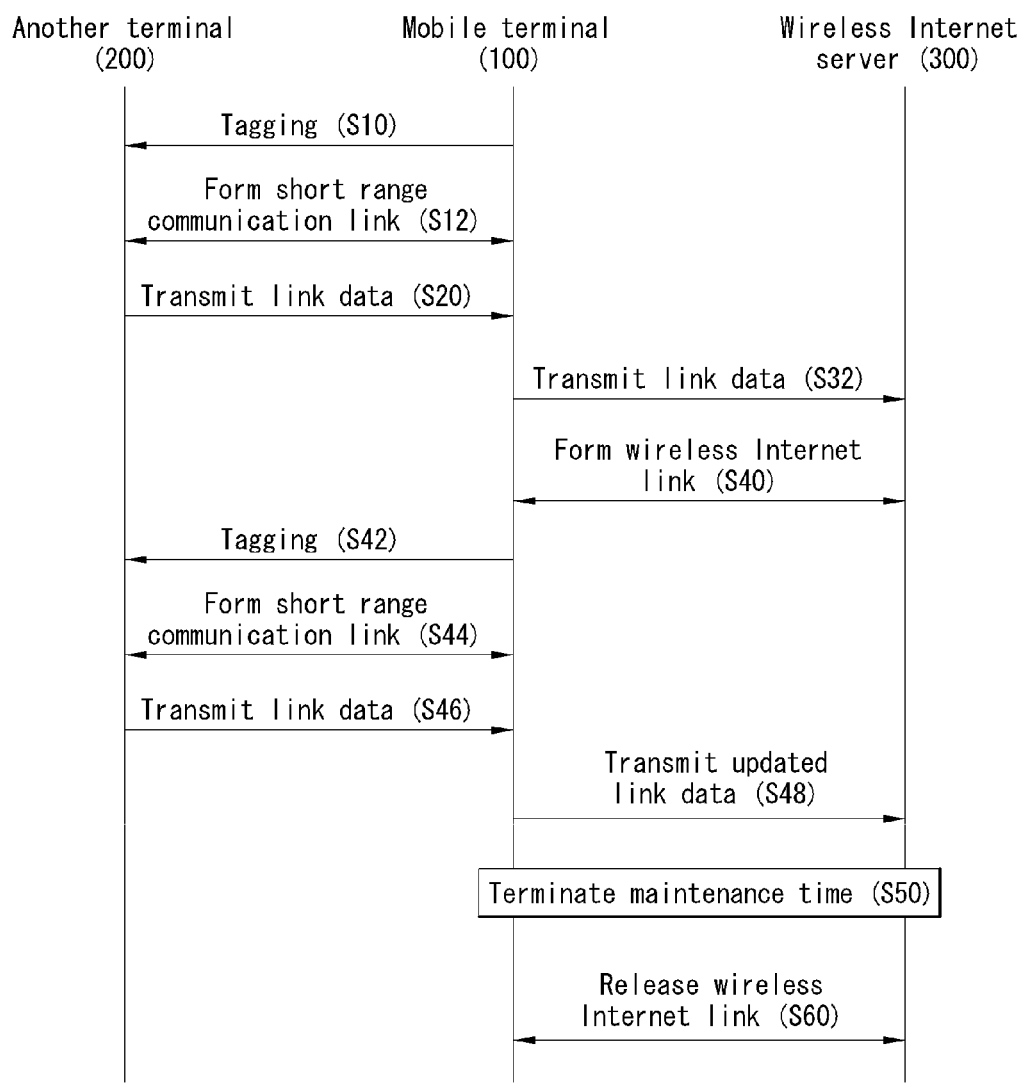
FIG. 7 is a diagram illustrating a message flow between a mobile terminal, another terminal, and a short range communication server according to an embodiment of the present invention.

FIG. 7 is a diagram illustrating a message flow between a mobile terminal, another terminal, and a short range communication server according to an embodiment of the present invention.

As shown in FIG. 7, the mobile terminal 100 according to an embodiment of the present invention is tagged to the another terminal 200 (S10).

When the mobile terminal 100 is tagged to the another terminal 200, a short range communication link is formed between the mobile terminal 100 and the another terminal 200 (S12). For example, an NFC communication link may be formed.

When a short range communication link is formed, link data are transmitted from the another terminal 200 to the mobile terminal 100 (S20). The link data may be data necessary for handover and include maintenance information, as described above.

The mobile terminal 100 transmits the link data to the wireless Internet server 300 (S32) and a wireless Internet link is formed based on the link data (S40).

The wireless Internet server 300 may be another electronic device having a managing attribute of communication using wireless Internet. The wireless Internet server 300 communicates with the mobile terminal 100 through an access point (AP).

A wireless Internet link is formed between the mobile terminal 100 and the wireless Internet server 300 through transmission of link data. That is, handover can be performed from a short range communication link to a wireless Internet link.

The wireless Internet link is maintained according to maintenance information. For example, a maintenance time of a wireless Internet link and a transmission quality of data may be determined based on maintenance information.

The mobile terminal 100 is tagged again to the another terminal 200 (S42) to form a short range communication link between the mobile terminal 100 and the another terminal 200 (S44), and the mobile terminal 100 receives again link data (S46). The mobile terminal 100 transmits updated link data to the wireless Internet server 300 (S48).

When the link data are updated, a connection state of the wireless Internet link is updated, for example, a maintenance time may increase or a communication speed may be changed.

When the maintenance time is terminated (S50), a wireless Internet link between the mobile terminal 100 and the wireless Internet server 300 is released (S60).

FIGS. 8 to 12 are diagrams illustrating operation of a mobile terminal according to an embodiment of the present invention.

As shown in FIGS. 8 to 12, the mobile terminal 100 according to an embodiment of the present invention is tagged to an NFC tag 200, which is another electronic device to perform various operations.

Figure 8:
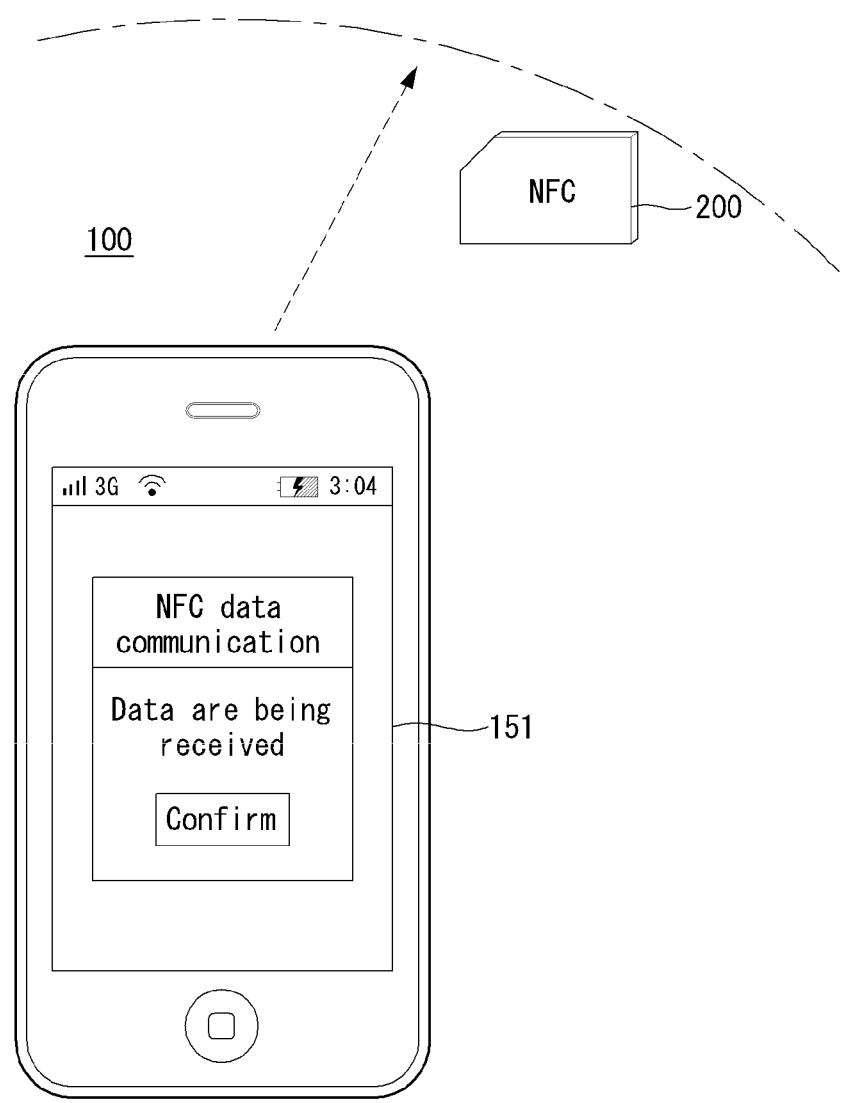

As shown in FIG. 8, when the mobile terminal 100 enters within a range that can communicate with the NFC tag 200, the mobile terminal 100 can perform NFC communication with the NFC tag 200. That is, a communication link can be formed between the mobile terminal 100 and the NFC tag 200.

In the display 151 of the mobile terminal 100, contents in which the NFC communication link is formed and data are thus received from the NFC tag 200 are displayed.

As shown in FIG. 9A, a paying process through a communication link formed through NFC is displayed in the display 151. For example, a process of buying coffee at a shop and paying a coffee cost using NFC communication of the mobile terminal 100 may be performed.

As shown in FIG. 9B, when a user selects payment, a message in which payment was complete is displayed. Further, a free use time of wireless Internet proportional to a paid amount of money may be provided. Wireless Internet can be used within a corresponding shop or within an allowed range.

As shown in FIG. 10A, a product is selected using NFC communication. That is, information such as product information, a price, and a use time period of corresponding wireless Internet can be acquired through a formed NFC communication link. The acquired information is displayed in the display 151.

As shown in FIG. 10B, when the user selects a specific product, completion of payment of the selected product and wireless Internet available information corresponding to a product price may be displayed.

As shown in FIG. 11A, the user can perform payment for a specific product using the mobile terminal 100.

As shown in FIG. 11B, when payment for a product is performed, a coupon corresponding to payment is issued. The coupon is issued through an NFC communication link. The coupon may be a means for verifying a right that can use other products or services free of charge or with a discounted price at a corresponding shop or at a related shop. The user can store or use an issued coupon.

As shown in FIG. 12A, the mobile terminal 100 includes a menu for managing an issued coupon. A management menu of a coupon may include a menu for using the coupon, transmitting the coupon to another person, or deleting the coupon.

As shown in FIG. 12B, the mobile terminal 100 performs a guide about a service period of a coupon. For example, in a coupon having a predetermined service period, the remaining period that can use the coupon may be guided.

Figure 13:
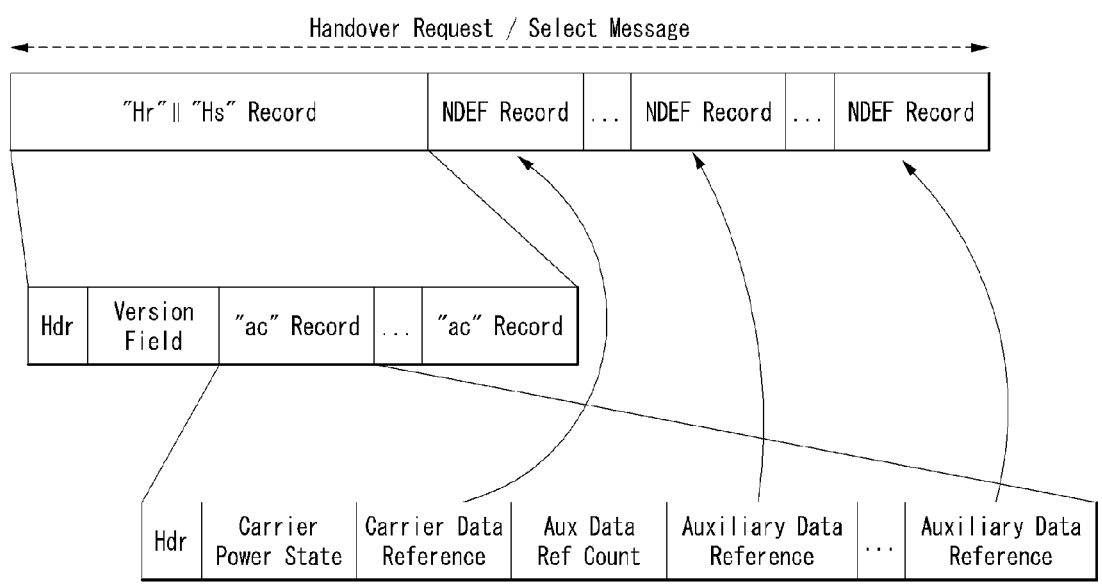
FIG. 13 is a diagram illustrating a structure of a handover message according to an embodiment of the present invention.

FIG. 13 is a diagram illustrating a structure of a handover message according to an embodiment of the present invention.

A message used for a handover process includes a handover request message and a handover selection message.

Referring to an upper end of FIG. 13, the handover request message according to an embodiment of the present invention includes a handover request record (hereinafter, Hr) and one or more NFC data exchange format (NDEF) record. Further, the handover selection message (hereinafter, Hs record) includes a handover selection record and one or more NDEF record.

The NDEF record includes detailed information about an alternative carrier. More specifically, a type of information included by an NDEF record included in the handover request message may be various. For example, information included by the NDEF record may include information for identifying an alternative communication link. That is, a handover carrier record can provide information about an alternative communication means in which the handover request device supports to the handover selection device. In this document, an NDEF record including information for identifying an alternative communication link is referred to as a handover carrier record.

Information included by the NDEF record includes environment setting information for forming an alternative communication link. In this document, an NDEF record including environment setting information necessary for forming an alternative communication link, for example, a password, an address, etc., necessary for forming a link is referred to as carrier environment setting record. The carrier environment setting record further includes information for identifying an alternative communication means.

A detailed description of the handover carrier record and the carrier environment setting record will be described later.

Referring to an intermediate end of FIG. 13, a handover request/selection record according to an embodiment of the present invention includes at least one of a Hdr, a version field, and one or more alternative carrier record (hereinafter, ac record), and the alternative carrier record defines an alternative carrier requested/selected by a handover request/selection message. Further, the handover request/selection record may include information fields fewer than or more than the handover request/selection record.

Referring to a lower end of FIG. 13, an ac record according to an embodiment of the present invention includes at least one of information fields of an Hdr, a carrier power state, a carrier data reference, an auxiliary data reference count, and one or more auxiliary data reference. The carrier data reference and the auxiliary data reference indicate an NDEF record corresponding to an upper end of FIG. 13.

Figure 14:
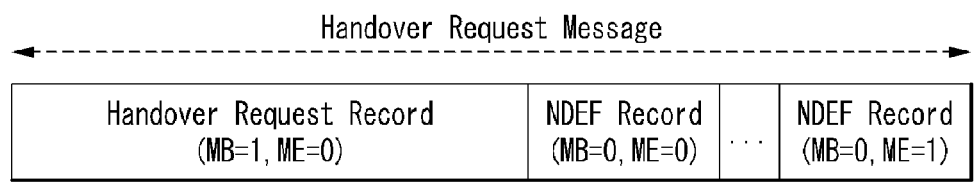
FIG. 14 is a diagram illustrating an example of a handover request message according to an embodiment of the present invention.

FIG. 14 is a diagram illustrating an example of a handover request message according to an embodiment of the present invention.

The handover request message is used for enabling the handover request device to provide information about an alternative carrier in which the handover request device supports to the handover selection device, as described above.

The handover request message includes a handover request record and one or more NDEF record. For example, the handover request message starts at a handover request record and terminates at an NDEF record. More specifically, the handover request message starts at a handover request record including a flag that is set at a message start MB and is terminated at an NDEF record having a flag that is set at a message end ME.

Because the handover request message should include at least one alternative carrier, the handover request message cannot have a record in which both MB and ME flags are set.

The NDEF record may be one of a handover carrier record and a carrier environment setting record according to a characteristic of an alternative carrier. Further, the NDEF record may be formed with auxiliary data. A detailed description of the NDEF record will be described later.

Figure 15:
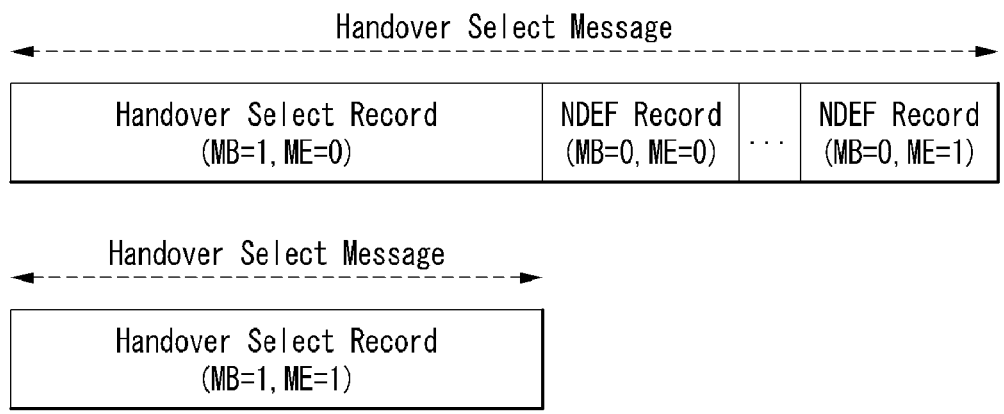
FIG. 15 is a diagram illustrating an example of a handover selection message according to an embodiment of the present invention.

FIG. 15 is a diagram illustrating an example of a handover selection message according to an embodiment of the present invention.

The handover selection message is used for providing information about an alternative carrier in which the handover selection device supports among alternative carriers included in a handover request message received from the handover request device to the handover request device.

Referring to an upper end of FIG. 15, a structure of the handover selection message may be equal to a structure of the handover request message described to reference to FIG. 14.

Further, referring to a lower end of FIG. 15, the handover selection message may include a single record in which both a message start MB and a message end ME are set. That is, this case may be a situation in which an alternative carrier in which the handover selector supports does not exist among alternative carriers in which the handover requester supports.

Figure 16:
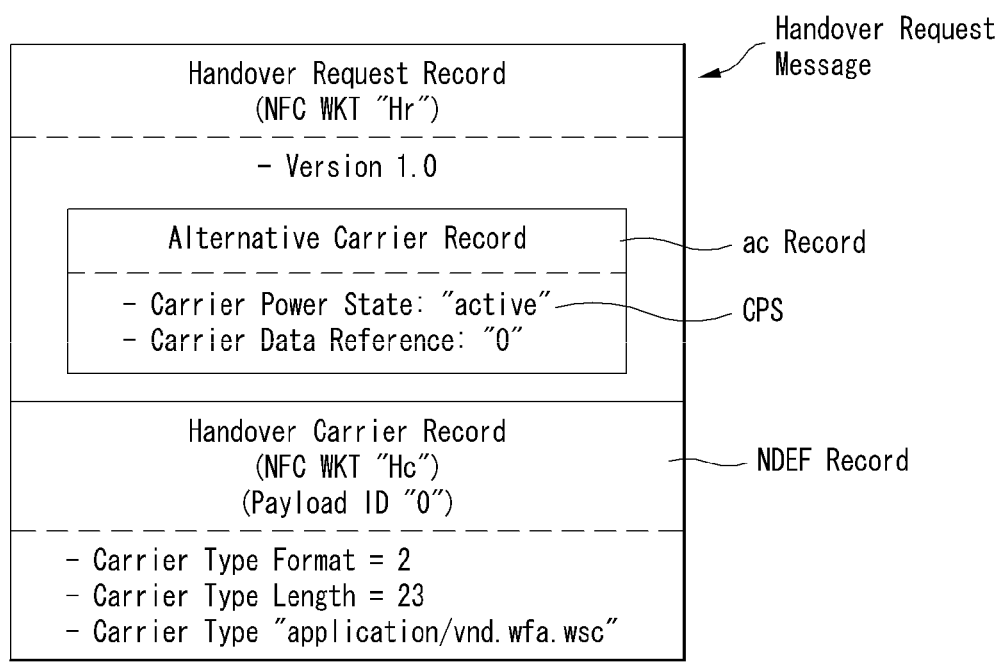
FIG. 16 is a diagram illustrating an example of a handover request message in which an alternative carrier is Wi-Fi according to an embodiment of the present invention.

FIG. 16 is a diagram illustrating an example of a handover request message when an alternative carrier is Wi-Fi according to an embodiment of the present invention.

As shown in FIG. 16, the handover request message includes a handover request record and a handover carrier record. That is, when the handover request device designates Wi-Fi as an alternative carrier, the NDEF record has a form of a handover carrier record, and the handover carrier record includes information for identifying Wi-Fi.

FIG. 17 is a diagram illustrating a binary content of a Wi-Fi handover request message according to an embodiment of the present invention. That is, FIG. 17 is another expression of the handover request message shown in FIG. 16.

Figure 18:
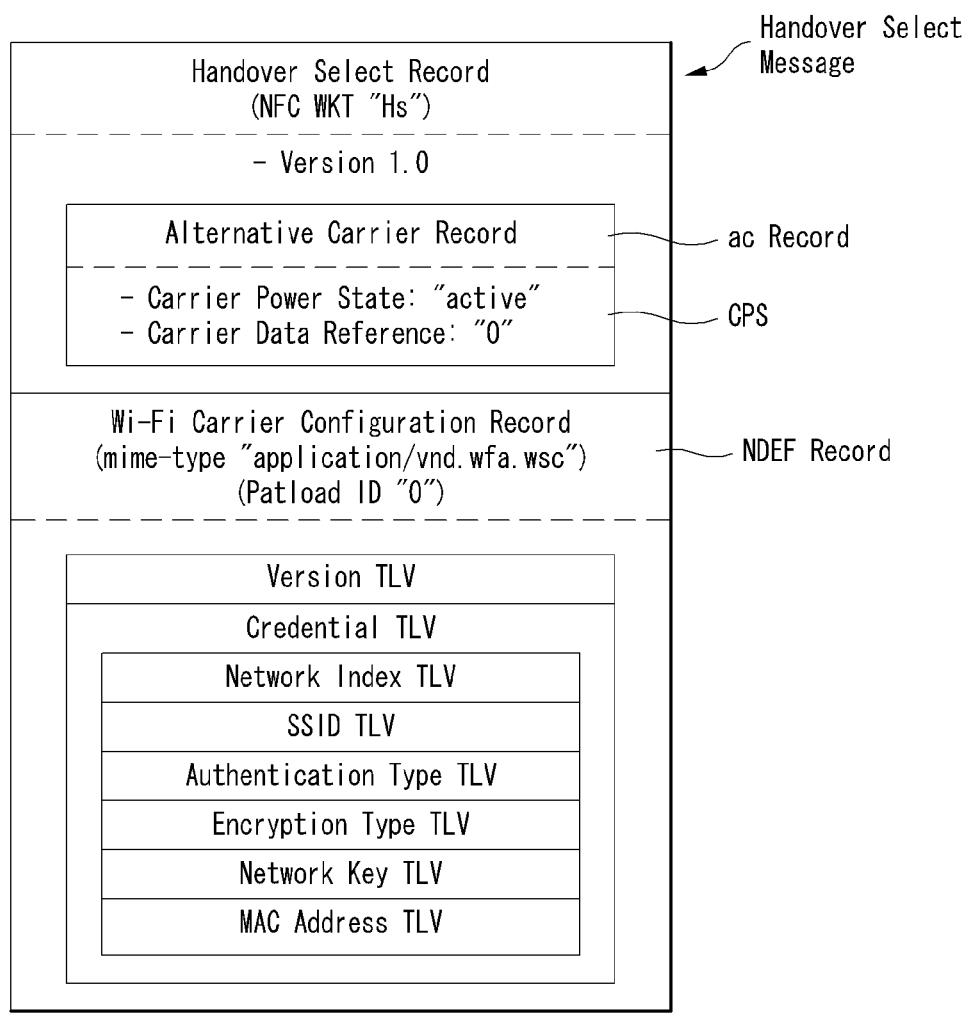
FIG. 18 is a diagram illustrating a handover selection message when an alternative carrier is Wi-Fi according to an embodiment of the present invention.

FIG. 18 is a diagram illustrating a handover selection message when an alternative carrier is Wi-Fi according to an embodiment of the present invention. As shown in FIG. 18, the handover selection message includes a handover selection record and a carrier environment setting record. That is, the carrier environment setting record is an example of an NDEF record described with reference to FIG. 18.

Referring to FIG. 18, a carrier environment setting record in which the handover selection device provides may be environment setting information necessary when the handover request device connects to Wi-Fi, which is an alternative carrier in which the handover selection device provides. For example, the carrier environment setting record may include information about a service set identifier SSID, an authentication type TLV, an encryption type TLV, a network key, and an MAC address TLV.

The handover selection device determines that an alternative carrier in which the handover request device supports is Wi-Fi based on information included in a handover carrier record received from the handover request device. When the handover selection device supports Wi-Fi, the handover request device generates environment setting information necessary for generating a Wi-Fi link with the handover selection device. The handover request device includes the generated environment setting information in a carrier environment setting record and transmits the carrier environment setting record to the handover request device.

The handover request device can connect to an alternative carrier, for example, Wi-Fi in which the handover selection device provides based on carrier environment setting information received from the handover selection device.

FIG. 19 is a diagram illustrating a binary content of a handover selection message according to an embodiment of the present invention. That is, FIG. 19 is another expression of the handover request message shown in FIG. 18.

As shown in FIG. 19, the handover selection message includes data of various fields including a version number.

Data include a maintenance time of Wi-Fi communication, which is a communication means in which handover is performed. A maintenance time field may be referred to as a time credit. The maintenance time field is formed in 1 byte size, and values between 0 and 255 are allocated to the maintenance time field. A specific number of 0 to 255 corresponds to a time that can be maintained by tagging operation for forming an NFC communication link. For example, the number of 15 may correspond to setting that can be maintained Wi-Fi connection for 30 minutes.

The maintenance time field is positioned at a reserved data area to be not overlapped with an existing data field.

FIG. 20 is a diagram illustrating a binary content of a handover selection message according to another embodiment of the present invention.

As shown in FIG. 20, a handover selection message according to another embodiment of the present invention further includes a purchase product field in addition to a maintenance time field.

The purchase product field includes information about a product in which the user of the mobile terminal 100 buys. When the purchase product field exists, information about a product in which the user buys can be shared and thus management of a customer can be easily performed.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    a wireless Internet module;
    a short range communication module; and
    a controller configured to exchange data through a second communication link using the wireless Internet module,
    wherein the second communication link is formed based on link data comprising maintenance information acquired through a first communication link with at least one other terminal positioned within a predetermined distance using the short range communication module.

2. The mobile terminal of claim 1, wherein the short range communication module is configured to form the first communication link by tagging with the at least one other terminal.

3. The mobile terminal of claim 1, wherein the maintenance information comprises information related to a connection state of the second communication link.

4. The mobile terminal of claim 3, wherein the connection state of the second communication link comprises at least a maintenance time or communication speed of the second communication link.

5. The mobile terminal of claim 1, wherein the maintenance information comprises information related to a product that a user of the mobile terminal buys.

6. The mobile terminal of claim 1, wherein the controller is further configured to transmit maintenance information acquired through the first communication link to another electronic device having a managing attribute of communication of a wireless Internet.

7. The mobile terminal of claim 1, wherein the maintenance information comprises handover data acquired through the first communication link.

8. The mobile terminal of claim 7, wherein the handover data comprises a service set identifier (SSID) and a media access control (MAC) address for forming the second communication link through the short range communication module.

9. The mobile terminal of claim 1, wherein the controller is further configured to update the maintenance information when the mobile terminal is tagged with the at least one other terminal.

10. The mobile terminal of claim 1, wherein the short range communication module is a near field communication (NFC) module, and the wireless Internet module is a Wi-Fi module.

11. A method of controlling a mobile terminal, the method comprising:
    forming a first communication link using a short range communication module with at least one other terminal;
    acquiring link data comprising maintenance information through the formed first communication link from the at least one other terminal; and
    forming a second communication link using a wireless Internet module based on the link data,
    wherein a connection state of the second communication link is set based on the maintenance information.

12. The method of claim 11, wherein the forming of a first communication link is performed after tagging with the at least one other terminal positioned within a predetermined distance.

13. The method of claim 11, wherein the connection state of the second communication link comprises at least a maintenance time or transmission speed of the second communication link.

14. The method of claim 11, wherein the maintenance information comprises information related to a product that a user of the mobile terminal buys.

15. The method of claim 11, further comprising transmitting the maintenance information acquired through the first communication link to another electronic device having a managing attribute of communication of a wireless Internet.

16. The method of claim 11, wherein the maintenance information comprises handover data acquired through the first communication link.

17. The method of claim 16, wherein the handover data comprises a service set identifier (SSID) and a media access control (MAC) address for forming the first communication link through the short range communication module.

18. The method of claim 11, further comprising updating the maintenance information when the mobile terminal is tagged with the at least one other terminal.

19. A method of controlling a mobile terminal, the method comprising:
    forming a first communication link with at least one other terminal using a short range communication module;
    acquiring link data comprising maintenance information from the at least one other terminal via the formed first communication link; and
    forming a second communication link based on the link data using a wireless Internet module,
    wherein a connection state of the second communication link is set based on the maintenance information.

* * * * *